March 27, 1962 J. E. SPURLING 3,026,727
MASS FLOW SENSOR
Filed April 5, 1960 4 Sheets-Sheet 1

JOHN E. SPURLING
INVENTOR

BY Beehler & Shanahan
ATTORNEYS

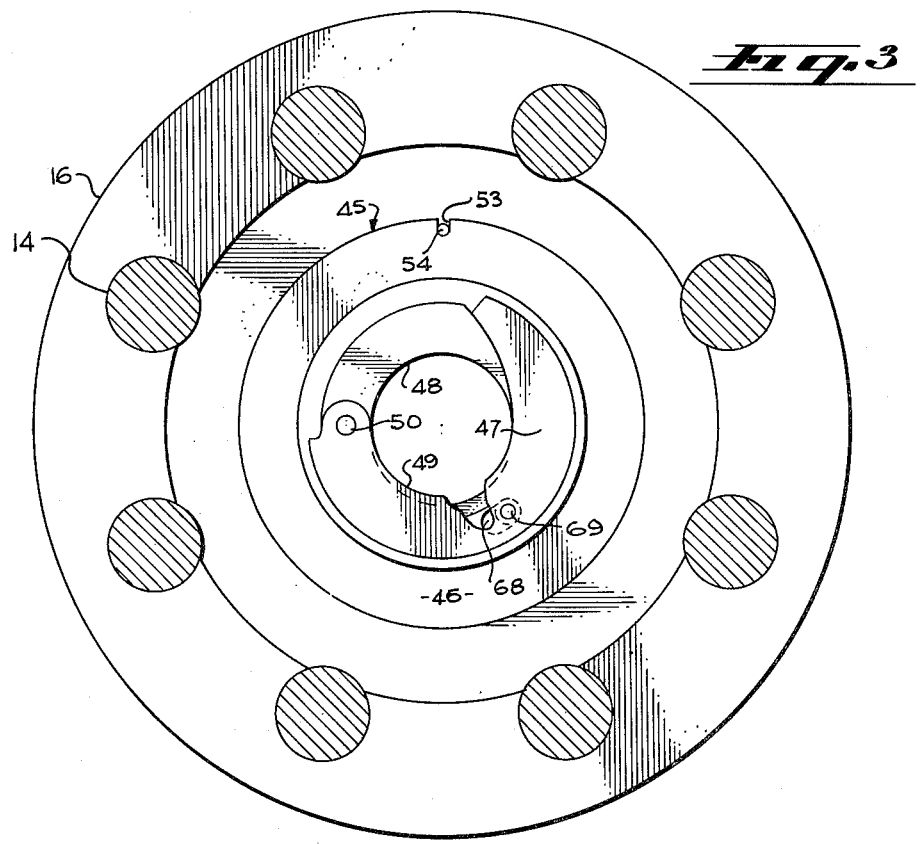
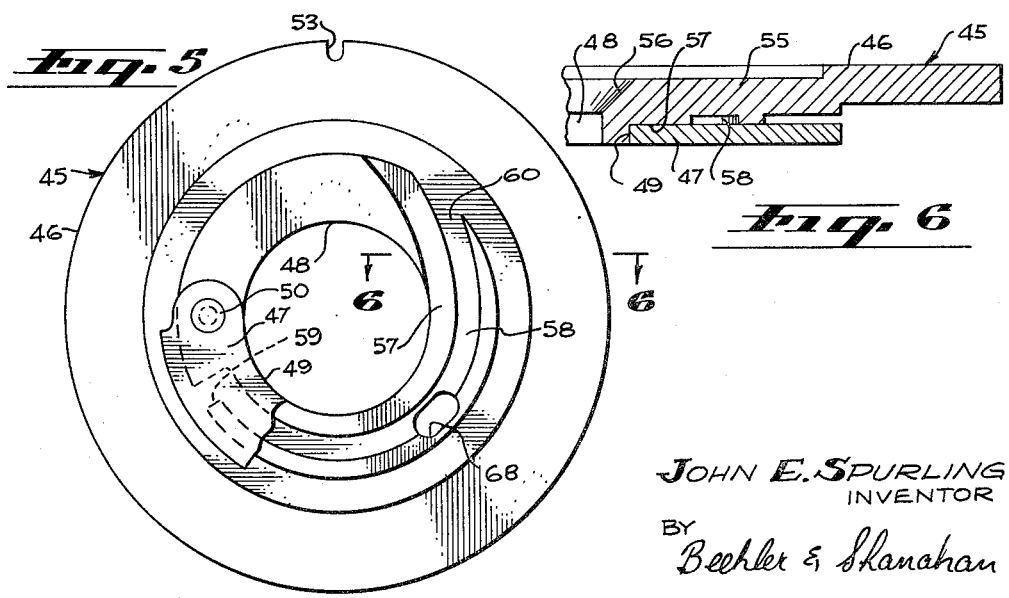

March 27, 1962  J. E. SPURLING  3,026,727
MASS FLOW SENSOR
Filed April 5, 1960  4 Sheets-Sheet 3

JOHN E. SPURLING
INVENTOR

BY Beehler & Shanahan
ATTORNEYS

March 27, 1962   J. E. SPURLING   3,026,727
MASS FLOW SENSOR
Filed April 5, 1960   4 Sheets-Sheet 4

JOHN E. SPURLING
INVENTOR
BY
Beehler & Shanahan
ATTORNEYS

United States Patent Office 3,026,727
Patented Mar. 27, 1962

3,026,727
MASS FLOW SENSOR
John E. Spurling, Encino, Calif., assignor to International Electronic Research Corp., Burbank, Calif., a corporation of California
Filed Apr. 5, 1960, Ser. No. 20,080
8 Claims. (Cl. 73—211)

The invention relates to instruments for detecting variations in the condition of fluids and liquids for the purpose of measuring and recording the same and has special reference to a device commonly identified as a mass flow sensor in that it is automatically adjusted with respect to changes in density of the fluid, thereby to make certain of an accurate measurement of the mass of fluid flowing through a system irrespective of the volume. The invention herein disclosed comprises improvements on co-pending applications Serial No. 7,559, filed February 9, 1960, and Serial No. 8,636, filed February 15, 1960.

Although the need for measuring fluid and liquid quantities by mass or weight, as that term is commonly used, has been recognized and appreciated, and furthermore although some attempts have been made to devise instrumentation capable of discounting emphasis previously placed upon volume sensing in favor of weight sensing, the technology involved in instrumentation of this kind has been relatively new and to a large degree untested heretofore. In struments which have been devised have had certain limitations which time and inventive skill have not heretofore surmounted. Moreover, demands placed upon instruments of this kind by employment of the so-called exotic fuels and gases and liquids at extraordinarily high and low temperatures has taxed the ability of even the more improved instruments. Further still, because of the extraordinary dependability demanded of instruments of this kind, prior art devices capable of operating under ordinary circumstances have been incapable of performing dependably under new and different conditions and also after extended periods of use.

It is accordingly among the objects of the invention to provide a new and improved mass flow sensor which is well adapted to use under a relatively large variety of conditions with acceptable dependability and which, moreover, is so constructed that where demands outside of the ordinary range of the instrument are present the instrument can be changed to meet such demands by replacement of incidental parts without any reconstruction of the instrument as a whole being necessary.

Another object of the invention is to provide a new and improved mass flow sensor which is so constructed that it is particularly sensitive without change to a wide variety of conditions predicated upon temperature, pressure, density and other characteristics, the versatility being built into the design of the device.

Still another object of the invention is to provide a new and improved mass flow sensor of relatively simple design and construction such that the delicate parts may be made separately and with a high degree of precision and thereafter assembled in a simple assembly operation which greatly promotes incorporation of precision characteristics into the device and which, moreover, makes possible a device which is very readily disassembled for servicing or alterations as conditions may warrant.

Still further among the objects of the invention is to provide a new and improved mass flow sensor embodying a bimetallic actuator for varying the setting of a variable thin plate orifice, the bimetallic actuator being subject to removal and replacement with an actuator of different characteristics to accommodate different demands, the bimetallic actuator or drive, moreover, being capable of performance at extremely low temperatures where bimetallic characteristics vary considerably from the normal without necessity of reconditioning the instrument for such excessive low temperature operations.

Also included among the objects is to provide a new and improved mass flow sensor, the moving parts of which are counterbalanced so as to be unaffected by excessive pressure differentials and which is so constructed as to accurately and dependably record pressure differentials throughout a wide range of pressure differences.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 3 is a cross-sectional view taken on the line 3—3 of FIGURE 2.

FIGURE 5 is an elevational view of the orifice assembly partially broken away to show significant structural features.

FIGURE 6 is a fragmentary cross-sectional view taken on the line 6—6 of FIGURE 5.

Figure 2:
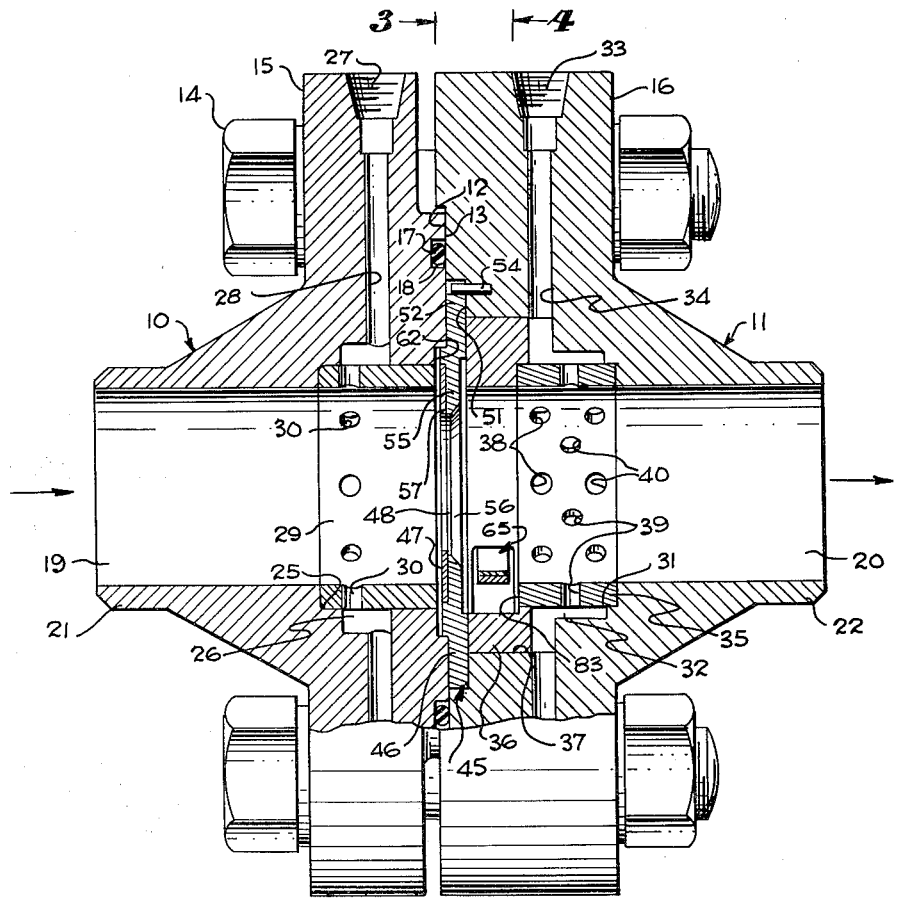
FIGURE 2 is a longitudinal sectional view taken on the line 2—2 of FIGURE 1.
Figure 1:
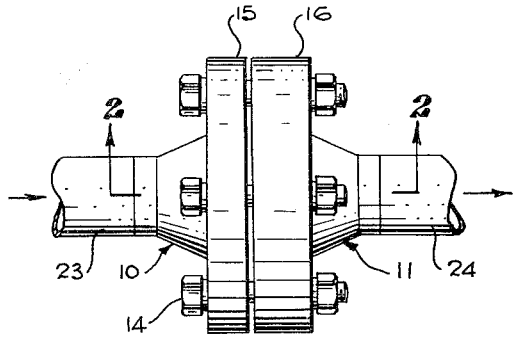
FIGURE 1 is a side elevational view of the assembled device.

In an embodiment of the invention chosen for the purpose of illustration there is shown a two-part housing comprising an upstream fitting 10 and a downstream fitting 11. The upstream fitting has a sealing face and the downstream fitting has a complementary sealing face 13 which is pressed into sealing engagement with the upstream face by action of connecting bolts 14 extending through flanges 15 and 16, respectively, on the upstream fitting and the downstream fitting. To improve the effectiveness of the seal there may be provided an O-ring seal 17 contained within an appropriate recess 18.

In the upstream fitting there is provided a central passage 19 in axial alignment with a corresponding central passage 20 in the downstream fitting which together may be considered as forming a chamber within the housing. The upstream fitting furthermore is provided with a conventional connection 21 and the downstream fitting with a conventional connection 22 whereby pipes 23 and 24 may be attached to the device.

Within the passage 19 there is provided an enlargement 25, annular and cylindrical in character, around the outer portion of which is an additional annular pocket 26. One or more meter connections 27 may be provided which communicates through a bore 28 in each instance with the annular pocket 26.

A cylindrical guide ring 29 is located within the enlargement 25 and is of such internal diameter that the internal wall lies flush with the wall of the passage 19 when in assembled position as shown. A series of perforations 30 extend through the guide ring throughout a circumferential area and provide means of communication between the passage 19 and the meter connection 27 so that the pressure condition in the passage 19 on the upstream side of the device can be conveyed to a suitable conventional meter (not shown).

The downstream fitting is constructed to a degree somewhat similarly in that there is provided an annular enlargement 31 at the outer portion of which is an annular pocket 32. One or more downstream meter connections 33 may be provided communicating with the annular pocket 32 by means of a bore 34. Here also there is provided what is identified as a piezometer ring 35 which fits with a snug slip fit within the enlargement 31 wherein it may be held by employment of a special ring 36 fitting within an appropriately sized and shaped recess 37.

The piezometer ring is provided in the embodiment shown with three circumferential series of perforations, perforations 38 lying on the upstream end of the piezometer ring, perforations 39 at the mid-portion, and perforations 40 at the downstream end. The perforations are large enough so that they effectively overlap and moreover extend at spaced locations entirely around the ring. Located as shown and having the size suggested, it will be clear that the aggregate effect of the perforations in providing a communication between the annular pocket 32 and the passage 20 will be at the vena contracta of the stream even though the location of the vena contracta may shift upstream under some conditions and downstream under other conditions with respect to the normal expected location. The range of location of the perforations is made such as to accommodate all variations which may be expected in any particular liquid line without the necessity of changing the instrument. However, by providing a removable piezometer ring 35 which can be slipped into place and as readily removed, should the instrument be needed for work of an altogether different nature wherein an entirely different effect may be expected at the location of the vena contracta, a different piezometer ring equipped with a different pattern of perforations may be substituted. It is important to note, moreover, that the perforations extend entirely around the perimeter of the ring so that if there is any variation in the perimeter of the vena contracta due to any slight non-circularity of the orifice opening, the average condition will be realized by pick-ups on virtually all sides so as to correctly reflect the pressure condition at the vena contracta when a lead is carried to the conventional meter (not shown) with which such devices are provided.

Located between the upstream fitting and the downstream fitting is a thin plate orifice assembly 45. The orifice assembly is shown separately in some detail in FIGURE 6 and its location in the housing is shown in FIGURES 2 and 3. The orifice assembly comprises essentially a relatively fixed orifice plate element 46 of somewhat composite construction and a relatively movable orifice plate element 47. An orifice opening 48 of fixed size and perimetral configuration is located centrally within the fixed orifice element 46. The movable orifice element 47 is provided with an arcuate inner edge 49 which conforms partially to the perimeter of the orifice opening 48 over a portion thereof and which in the various contracted positions assists in determining the area available for the passage of fluid through the orifice opening 48. The movable orifice element is pivotally mounted upon the fixed orifice element by employment of a pin 50.

To assist in mounting the orifice assembly there is provided a recess 51 in the downstream fitting 11 in which a rim 52 of the fixed orifice plate fits. A notch 53 is provided in the rim adapted to receive a pin 54 in order to prevent rotation of the fixed orifice element once in position. Spaced inwardly of the rim 52 is an annular interior flange 55 having a beveled or tapered portion 56 immediately surrounding the orifice opening 48 on the downstream side thereof in order to establish definitely what is known in hydraulics as a thin plate orifice. On the upstream side of the annular interior flange 55 in an arcuate recess 57 providing an arcuate area within which the movable orifice element is mounted. The arcuate area is readily visible in FIGURE 5 throughout the portion from which the movable orifice element has been broken away. Extending throughout the length of the arcuate area is an arcuate channel 58 having an opening 59 at one end and an opening 60 at the opposite end, thus providing free and unrestricted access to the channel from the upstream passage 19. Since the channel 58 extends throughout substantially the entire length of the movable orifice element in all positions of adjustment of the movable orifice element, pressure on both sides is equalized so that there will be no binding or restrictive effect upon free movement of the movable element under all pressure conditions which may be encountered. The thickness of the fixed orifice plate 46 and the spacing between the bottom of the recess 51 in the downstream fitting and a bottom of a recess 62 in the upstream fitting provides sufficient clearance between the upstream fitting and the adjacent face of the movable orifice plate to assure free and unrestrictive movement, regardless of how tight the joint between the fittings may be made.

In the device herein described the movable orifice element or plate is designed to be actuated by movement of the free end of a bimetalic strip 65 which may be identified as a bimetallic actuator. The bimetallic strip is substantially conventional in its construction in that it is prepared of two metal strips of different characteristics fastened together so that when subjected to variations in temperature, expansion and contraction of one will differ from the other causing the compound strip to move in an arcuate direction, the force of this movement being employed to move the movable orifice element 47 in a comparable fashion.

Figure 4:
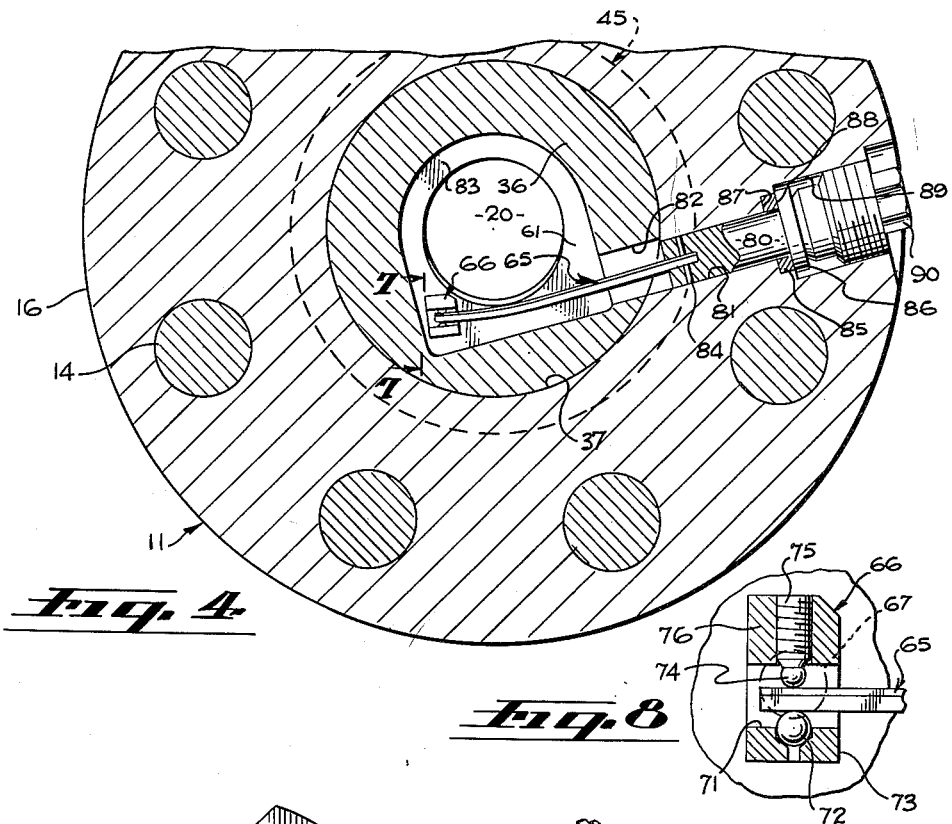
FIGURE 4 is a cross-sectional view taken on the line 4—4 of FIGURE 2.
Figure 8:
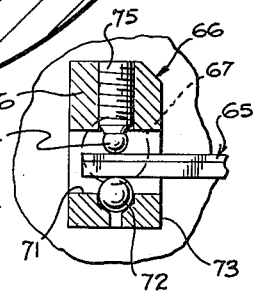
FIGURE 8 is a fragmentary sectional view taken on the line 8—8 of FIGURE 7.
Figure 9:
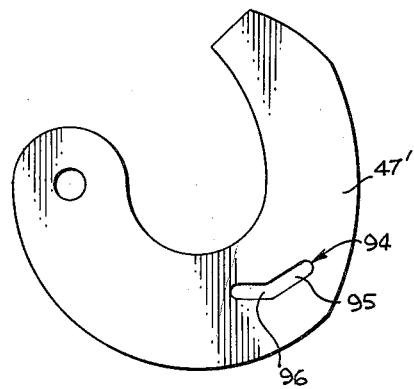
FIGURE 9 is a plan view of one form of movable orifice element showing a cam slot adapted to extreme low temperature work.
Figure 7:
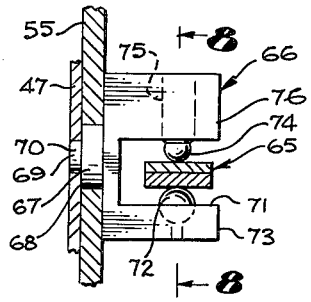
FIGURE 7 is a fragmentary sectional view of the connection between the bimetallic actuator and the movable orifice element taken on the line 7—7 of FIGURE 4.

To convey the motion from the strip 45 to the movable orifice element, there is provided in the first described embodiment a yoke 66 shown separately in FIGURES 7 and 8 and shown in its operating location in FIGURE 4. The yoke has an integral bushing 67 extending outwardly through an elongated opening 68 in the interior flange 55 terminating in a cylindrical projection 69 which is rotatably received in a hole 70 in the movable orifice element 47.

On the opposite sides the yoke is provided with a slot 71 substantially wider than the breadth of the bimetallic strip 65 as appears in FIGURES 7 and 8. A jewelled mounting is embodied in a ball 72 in a leg 73 of the yoke and a spherical end 74 of a screw 75 in a leg 76 of the yoke. The screw is subject to adjustment in order to get a precisely desired engagement with the bimetallic strip 65.

As the bimetallic strip flexes under varying temperature conditions, the end which is in engagement with the yoke also flexes and in addition changes position slightly. The effect is to rotate the yoke to the same slight degree as it is shifted by the flexing within the recess 61, thus causing the movable orifice element 47 to rotate about the pin 50 and thus contract or enlarge the effective opening of the orifice opening 48 dependent upon the temperature condition.

In the instrument here under consideration the bimetallic strip 65 is removable for replacement with a different bimetallic strip as the need may arise.

To make the bimetallic strip removable, it is fastened to a mounting plug 80 which fits slidably into a mounting hole 81 in the downstream fitting 11. The mounting hole communicates with a similar hole 82 in the special ring 36 previously described, the hole 82 being one opening into a space 83 partly surrounding and partly including the passage 20. The strip 65 is anchored to the mounting plug by means of a pin 84.

At the outer end of the mounting plug is a collar 85 which fits over a sealing washer 86 located in a groove 87 below a bottom wall 88 of a threaded recess 89. The mounting plug is free to rotate when inserted into position so that the strip 65 can be aligned with the slot 71 of the yoke and thus have those two parts in proper relative position. A sealing plug 90 which has a threaded engagement with the threaded recess 89 is then forced into position pressing the collar 85 into sealing relationship with the sealing washer and the bottom wall 88 thus anchoring the strip and its mounting plug securely in position, while at the same time sealing the mounting hole. Should it become desirable at any time to substitute a bimetallic strip 65 having different characteristics for the strip shown in position, the substitution can readily be accomplished by removing the sealing plug 90, after which the mounting plug can be withdrawn together with the strip 65 and a new strip with its mounting plug substituted. It will be apparent that this change can be quickly and easily made without altering any other portion of the device.

Figure 10:
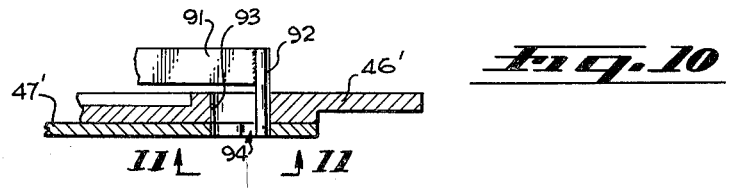
FIGURE 10 is a fragmentary sectional view of another form of bimetallic drive connection usable with the movable element of FIGURE 9.
Figure 11:
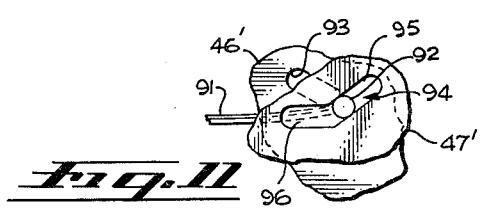
FIGURE 11 is a fragmentary elevational view partially broken away taken on the line 11—11 of FIGURE 10.

Although excellent results can be obtained by employment of the pivoted yoke 66 just described, a second form of attachment of the strip to the movable orifice plate has been found satisfactory in other installations. In this form illustrated particularly in FIGURES 10 and 11, a modified bimetallic strip 91 has a rod 92 secured to its movable end and extending transversely with respect to the strip. The rod 92 is permanently attached to the strip and may be kept short enough to permit insertion through the mounting hole 81 which obviously can be varied in size and made somewhat greater in diameter if the length of the rod 92 so demands or, in the alternative, a channel (not shown) may be broached along the wall of the mounting hole to permit sliding the rod through it into position.

Once in position, the rod extends through a clearance slot 93 in a slightly modified fixed orifice plate element 46' and thence into a composite cam slot 94 in a slightly modified movable orifice plate element 47'. It will be noted that the composite cam slot 93 has a relatively longer portion 95 and a relatively shorter portion 96 which communicate with each other at a slight angle. To appreciate the utility of the composite cam slot, reference is made to the graphs of FIGURES 12 and 13.

Figure 12:
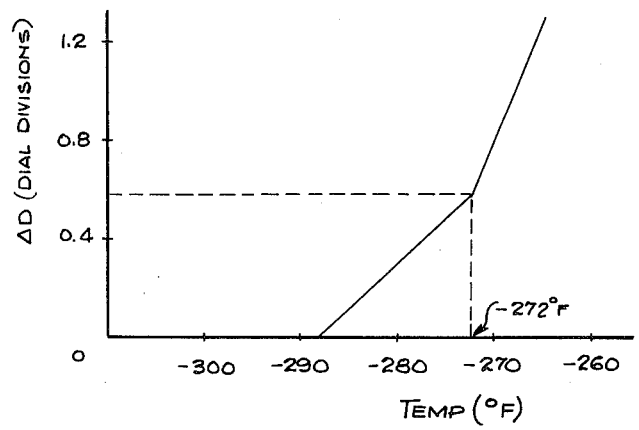
FIGURE 12 is a graph illustrating variations in bimetallic strip performance at critical low temperatures.

Having reference to FIGURE 12, it will be noted that there has been plotted the curve of movement of a bimetallic strip throughout ranges of temperatures from about 260° below zero Fahrenheit to slightly over 290° below zero Fahrenheit as a function of dial divisions, indicative of movement of the free end of the bimetallic strip. From this graph of performance it will be noted that the strip moves in a constant fashion linearly until the temperature reaches that of minus 272° F. Incidentally, although not shown on the graph, the same performance of the bimetallic strip occurs at virtually all temperatures above the highest temperature of minus 260° plotted on the graph.

At minus 272° F., however, the motion of the free end of the biemtallic strip departs appreciably from the motion enjoyed down to that point and in a reverse direction. Consequently, unless some special provision is made for these excessively low temperatures, the bimetallic strip when employed as an actuator for a movable orifice element will begin to reverse the operation of the movable orifice element opening the orifice at the very low temperatures instead of continuing to close the orifice element which it should do in order to compensate for greater densities in the fluid at the excessively low temperatures. In order, therefore, to force the movable orifice element to perform as it should and continue to close, the portion 96 of the cam slot is cut at a different angle from the portion 95 at a predetermined location which may be determined by customary calibrating procedures. The angle of the portion 96 will be made such that even though the rod 92 begins reverse travel at minus 272° F., the cam slot will cause the movable orifice element 47' to continue to diminish the size of the orifice opening.

Figure 13:
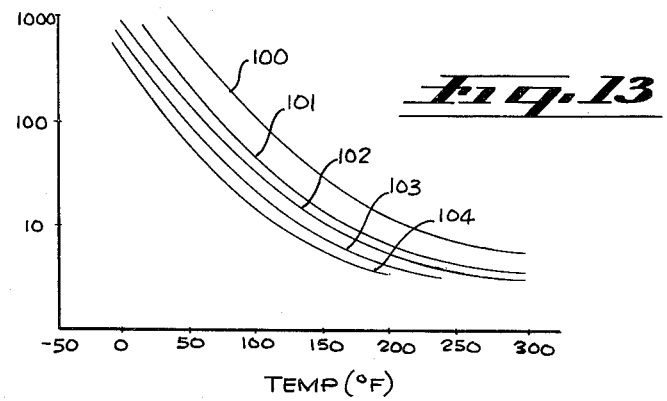
FIGURE 13 is a graph plotted to show non-linearity of the slope of the density curve for fluids employed as a guide in determining computation of the cam slot in the movable orifice element.

It is also found advisable to carefully determine the slope of the portion 95 of the cam slot in order to compensate for non-linearity of change in density of the fluid being measured in response to changes in temperature. Characteristic curves showing the changes in density as a result in changes of temperature are shown in FIGURE 13 for typical fluids. The most important aspect of the graph of FIGURE 13 is the curvature of the lines showing the change to be non-linear. The chart of FIGURE 13, although constructed on a basis of certain petroleum oils of different characteristics, is nevertheless representative of virtually all types of fluids in this respect. Viscosity has been plotted in centistokes along the vertical coordinant and temperature has been plotted in degrees Fahrenheit along the horizontal coordinant from minus 50 to plus 300. In order to translate this curvilinear change in density to a rectilinear change in the orifice opening, the portion 95 of the cam slot is provided extending in a proper direction so that as the rod 92 is moved responsive to changes in temperature, proper movement of the movable orifice element is achieved by the camming effect of the composite cam slot 93 and particularly the portions 95 and 96 thereof.

The petroleum oils of FIGURE 13 are identified as follows, namely, curve 100 representing "Univis" #90, curve 101 "Univis" #60, curve 102 "Univis" #54, curve 103 "Univis" #47, curve 104 "Univis" #40. It will be understood, however, that these are examples only. Similarly the bimetallic material employed in the construction of the graph of FIGURE 12 is identified as "Bimetal PR675–R" as that material is known commercially.

From the foregoing description it will be readily understood that the mass flow sensor herein described is one constructed in such fashion that the upstream and downstream fittings forming the main portion of the housing are readily separated and as separate pieces can be machined and formed with a high degree of accuracy as well as relatively inexpensively. The critical parts and movable parts exemplified in part by the piezometer ring, the orifice assembly, and the bimetallic unit can each in turn be carefully and inexpensively constructed separately in such fashion that they can be fitted into the housing without necessitating a special fitting procedure for each assembly. Moreover, both the orifice assembly and the bimetal strip assembly can readily be interchangeable even after the entire device has been put together, the same interchangability being inherent in the piezometer ring and the guide ring 29. The result is a simple, dependable, mass flow sensor which can be suited to a great variety of conditions and also one which is of a highly dependable character.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A base assembly for a mass flow sensor comprising an upstream fitting and a downstream fitting forming a housing, said fittings having complementary sealing faces and means releasably holding said faces in operative engagement, said fittings having openings respectively extending therethrough forming a passage for the flow of fluid, a thin plate orifice assembly confined between said passages, said orifice assembly comprising a fixed orifice element having an orifice opening therethrough and a movable orifice element mounted in operative relationship with the fixed orifice element adapted on movement of said movable orifice element to vary the size of the orifice opening whereby the location of the vena contracta shifts to different corresponding axial positions, an annular perforate ring in the passage of the downstream side of the orifice, aperture means in the ring extending throughout the limits of location of the vena contracta, and a fluid pressure connection in said housing in communication with the aperture means therein, means forming a passageway from the passage at the upstream side of the orifice opening to the downstream side of said movable orifice element whereby to balance pressures on opposite sides of said movable orifice element, and a bimetallic actuator assembly retained in sealing position in said housing including a connection between the inner end of said bimetallic actuator assembly and said movable orifice element whereby to render said movable orifice element subject to changes in temperature.

2. A base assembly for a mass flow sensor comprising an upstream fitting and a downstream fitting forming a housing, said fittings having complementary sealing faces and means releasably holding said faces in operative engagement, said fittings having central passages respectively extending therethrough for the flow of fluid, a thin plate orifice assembly confined between the passages, said orifice assembly comprising a fixed orifice element having an orifice opening therethrough and a movable orifice element mounted in operative relationship with the fixed orifice element adapted on movement of said movable orifice element to vary the size of the orifice opening whereby the location of the vena contracta shifts to different corresponding axial positions, means forming annular enlargements in the respective central passages at ends thereof adjacent each other, an annular perforate ring in each enlargement, aperture means in the ring of the downstream fitting extending throughout the limits of location of the vena contracta, and aperture means extending through the ring in the upstream fitting, and a fluid pressure connection in each fitting in communication with the respective enlargement therein, means forming a passageway from one of the central passages to the downstream side of said movable orifice element whereby to balance pressures on opposite sides of said movable orifice element, a bimetallic actuator assembly retained in sealing position in one of said fittings, and a movable connection between said bimetallic actuator assembly and said movable orifice element whereby to render said movable orifice element subject to changes in temperature.

3. A base assembly for a mass flow sensor comprising an upstream fitting and a downstream fitting forming a housing, said fittings having complementary sealing faces and means releasably holding said faces in operative engagement, said fittings having central passages respectively extending therethrough in axial alignment for the flow of fluid, a thin plate orifice assembly confined between said passages, said orifice assembly comprising a fixed orifice element having an orifice opening therethrough and a movable orifice element mounted in operative relationship with the fixed orifice element adapted on movement of said movable orifice element to vary the size of the orifice opening whereby the location of the vena contracta shifts to different corresponding axial positions, means forming an annular enlargement in the respective passage of the downstream fitting, an annular perforate piezometer ring in said enlargement, aperture means in the ring extending throughout the limits of location of the vena contracta, and a fluid pressure connection in said downstream fitting in communication with the enlargement therein, a special ring removably mounted in said enlargement adjacent the orifice assembly, means forming a passageway from one of the central passages to the downstream side of said movable orifice element whereby to balance pressures on opposite sides of said movable orifice element, means forming a mounting hole in said downstream fitting communicating between the exterior and the interior of one of said fittings, and means forming a hole in said special ring in communication between said mounting hole, and a bimetallic actuator assembly releasably retained in sealing position in said holes, a bimetallic strip on said bimetallic actuator assembly, a releasable movable connection between the inner end of said bimetallic strip and said movable orifice element whereby to render said movable orifice element subject to changes in temperature and a sealing plug in the outer end of said mounting hole forming a retaining seal for holding said bimetallic actuator assembly in operative position.

4. A base assembly for a mass flow sensor comprising an upstream fitting and a downstream fitting forming a housing, said fittings having complementary sealing faces and means releasably holding said faces in operative engagement, said fittings having central passages respectively extending therethrough in axial alignment for the flow of fluid, a thin plate orifice assembly confined in sealed relationship between said faces, said orifice assembly comprising a fixed orifice element having an orifice opening therethrough and a movable orifice element mounted in operative relationship with the fixed orifice element adapted on movement of said movable orifice element to vary the size of the orifice opening whereby the location of the vena contracta shifts to different corresponding axial positions, means forming annular enlargements in the respective central passages at ends thereof adjacent each other, the enlargement in the downstream fitting being within limits of location of the vena contracta, an annular perforate ring in each enlargement, means forming apertures in the ring in the upstream fitting in communication with the enlargement, means forming apertures in the ring on the downstream side throughout the limits of location of the vena contracta and in communication with the respective enlargement, and a fluid pressure connection in each fitting in commnuication with the respective enlargement therein, said movable orifice element having a position overlying a limited area on the upstream side of the fixed orifice element, means forming a passageway from one of the central passages to said limited area whereby to balance pressures on opposite sides of said movable orifice element, means forming a mounting hole in one of said fittings communicating between the exterior and the interior of said one fitting, a bimetallic actuator assembly releasably retained in sealing position in said mounting hole, a releasable movable connection between the inner end of said bimetallic actuator assembly and said movable orifice element whereby to render said movable orifice element subject to changes in temperautre, and a sealing plug in the outer end of said mounting hole forming a retaining seal for holding said bimetallic actuator assembly in operative position.

5. A mass flow sensor comprising a housing having a chamber therein forming a passage for the flow of fluid, a thin plate orifice assembly mounted transversely across said passage, said assembly comprising a fixed orifice element having an orifice opening therethrough and a movable orifice element having a pivotal mounting on the fixed orifice element and movable throughout a range of positions whereby to vary the size of said orifice opening, the housing having fluid pressure connections for measuring the pressure differential between fluid on the upstream side and fluid on the downstream side of said orifice opening, a bimetal actuator assembly for shifting said movable element in response to changes in temperature of said fluid and a releasable connection between said actuator and said movable orifice element, said actuator assembly comprising means forming a mounting hole in the housing, a mounting plug removably receptive in said mounting hole, a sealing plug removably mounted in said hole outside said mounting plug, and a bimetallic strip on the inner end of said mounting plug extending into said chamber, means forming a clearance opening in the fixed orifice element, said releasable connection comprising a yoke having a fastening portion extending through the clearance opening and rotatably mounted on said movable orifice element, a slot in said yoke in alignment with said bimetallic strip and a low friction bearing means in said slot releasably receptive of the inner end of said bimetallic strip whereby said movable orifice element is moved by said strip when the attitude of the strip changes in response to changes in temperature.

6. A mass flow sensor comprising a housing having a chamber therein forming a passage for the flow of fluid, a thin plate orifice assembly mounted transversely across said passage, said assembly comprising a fixed orifice element having an orifice opening therethrough and a movable orifice element having a pivotal mounting on the fixed orifice element and movable throughout a range of positions whereby to vary the size of said orifice opening, the housing having fluid pressure connections for measuring the pressure differential between fluid on the upstream side and fluid on the downstream side of said orifice opening, a bimetal actuator assembly for shifting said movable element in response to changes in temperature of said fluid and a releasable connection between said actuator and said movable orifice element, said actuator assembly comprising means forming a mounting hole in the housing, a mounting plug removably receptive in said mounting hole, a sealing plug removably mounted in said hole outside said mounting plug, and a bimetallic strip on the inner end of said mounting plug extending into said chamber, said releasable connection comprising a shaft on the inner end of said bimetallic strip, means forming a relief slot in said fixed orifice element and a cam slot in said movable orifice element, said shaft being movable in said slots in response to action of the bimetallic strip whereby said movable element is moved when the attitude of the strip changes in response to changes in temperature.

7. A mass flow sensor comprising a housing having a chamber therein forming a passage for the flow of fluid, a thin plate orifice assembly mounted transversely across said passage, said assembly comprising a fixed orifice element having an orifice opening therethrough and a movbale orifice element having a pivotal mounting on the fixed element and movable throughout a range of positions whereby to vary the size of said orifice opening, the housing having fluid pressure connections for measuring the pressure differential between fluid on the upstream side and fluid on the downstream side of said orifice opening, a bimetal actuator assembly for shifting said movable orifice element in response to changes in temperature of said fluid and including a bimetallic strip having a connection to said movable element, said connection comprising a shaft on the inner end of said bimetallic strip, a relief slot in said fixed orifice element and a cam slot in said movable orifice element, said shaft being positioned in said slots, said cam slot having a first portion extending in one direction to accommodate motion of said shaft throughout an upper temperature range wherein the bimetallic strip has one characteristic response and having a second portion extending in another direction to accommodate motion of said shaft throughout a lower temperature range wherein the bimetallic strip has another characteristic response whereby to progressively change said orifice opening in the same direction in response to changes in temperature in excessively low ranges wherein the effect on the bimetallic strip is at a variance with the effect at the higher ranges.

8. A mass flow sensor comprising a housing having a chamber therein forming a passage for the flow of fluid, a thin plate orifice assembly mounted transversely across said passage, said assembly comprising a fixed orifice element having an orifice opening therethrough and a movable orifice element having a pivotal mounting on the fixed orifice element and movable throughout a range of positions whereby to vary the size of said orifice opening, the housing having fluid pressure connections for measuring the pressure differential between fluid on the upstream side and fluid on the downstream side of said orifice opening, a bimetal actuator assembly for shifting said movable orifice element in response to changes in temperature of said fluid and a releasable connection between said actuator and said movable orifice element, said actuator assembly comprising means forming a mounting hole in the housing, a mounting plug removably receptive in said mounting hole, a sealing plug removably mounted in said hole outside said mounting plug, and a bimetallic strip on the inner end of said mounting plug extending into said chamber, said releasable connection comprising a shaft on the inner end of said bimetallic strip, a relief slot in said fixed orifice element and a cam slot in said movable orifice element, said shaft being positioned in said slots, said cam slot having a first portion extending in one direction to accommodate motion of said shaft throughout an upper temperature range wherein the bimetallic strip has one characteristic response and having a second portion extending in another direction to accommodate motion of said shaft throughout a lower temperature range wherein the bimetallic strip has another characteristic response whereby to progressively change said orifice opening in the same direction in response to changes in temperature in excessively low ranges wherein the effect on the bimetallic strip is at a variance with the effect at the higher ranges.

References Cited in the file of this patent

UNITED STATES PATENTS

| | | |
|---|---|---|
| 1,577,909 | Kath | Mar. 23, 1926 |
| 1,986,600 | Pigott | Jan. 1, 1935 |